US012747779B2

(12) United States Patent
Song et al.

(10) Patent No.: US 12,747,779 B2
(45) Date of Patent: Sep. 29, 2026

(54) ULTRA-SHORT ELECTROMECHANICAL SERVO MECHANISM FOR MECHANICAL FAULT SELF-RECOVERY

(71) Applicant: Beijing Institute of Precision Mechatronics and Controls, Beijing (CN)

(72) Inventors: Hongzhou Song, Beijing (CN); Zhiyuan Yu, Beijing (CN); Shoujun Zhao, Beijing (CN); Zaiping Zheng, Beijing (CN); Huili Dong, Beijing (CN); Yunfei Tao, Beijing (CN); Menglong Jiang, Beijing (CN); Shangling Qiao, Beijing (CN); Zhe Zhao, Beijing (CN); Yukai Yang, Beijing (CN)

(73) Assignee: Beijing Insitute of Preicsion Mechatronics and Controls, Beijing (CN)

( * ) Notice: Subject to any disclaimer, the term of this patent is extended or adjusted under 35 U.S.C. 154(b) by 23 days.

(21) Appl. No.: 18/879,892

(22) PCT Filed: Nov. 4, 2022

(86) PCT No.: PCT/CN2022/129940

§ 371 (c)(1),
(2) Date: Dec. 30, 2024

(87) PCT Pub. No.: WO2024/060364

PCT Pub. Date: Mar. 28, 2024

(65) Prior Publication Data

US 2026/0009454 A1 Jan. 8, 2026

(30) Foreign Application Priority Data

Sep. 22, 2022 (CN) ........................ 202211160078.0

(51) Int. Cl.
*F16H 25/24* (2006.01)
*F16D 27/02* (2006.01)
(Continued)

(52) U.S. Cl.
CPC ........... *F16H 25/205* (2013.01); *F16D 27/02* (2013.01); *F16H 25/2025* (2013.01);
(Continued)

(58) Field of Classification Search
CPC . F16H 25/2252; F16H 25/2025; F16H 25/205
See application file for complete search history.

(56) References Cited

U.S. PATENT DOCUMENTS

| | | | | |
|---|---|---|---|---|
| 8,109,163 | B2 * | 2/2012 | Hudson | F16H 25/2454 74/89.25 |
| 8,136,418 | B2 * | 3/2012 | Behar | B64C 13/341 244/99.2 |
| 10,066,715 | B2 * | 9/2018 | Larson | B64C 13/341 |

FOREIGN PATENT DOCUMENTS

| | | | | |
|---|---|---|---|---|
| CN | 107612205 | A | * | 1/2018 |
| CN | 107725705 | A | | 2/2018 |
| CN | 112460216 | A | | 3/2021 |

OTHER PUBLICATIONS

Written Opinion and International Search Report for corresponding PCT application PCT/CN2022/129940, mailed Jan. 18, 2023. (English and Chinese language translations) (16 pages).

* cited by examiner

*Primary Examiner* — Gregory Robert Weber
(74) *Attorney, Agent, or Firm* — Maginot, Moore & Beck, LLP

(57) ABSTRACT

An ultra-short electromechanical servo mechanism for mechanical fault self-recovery. Two sets of lead screw transmission components having the same lead parameters and bearing capacity are redundantly and coaxially
(Continued)

arranged, and are powered by a single servo motor set. A lead screw roll limiting electromagnetic clutch and a nut roll limiting electromagnetic clutch are used for realizing fault isolation when a primary lead screw pair is stuck or jammed. Meanwhile, a standby bearing lead screw pair is started to synchronously complete mechanical fault self-recovery.

13 Claims, 2 Drawing Sheets

(51) Int. Cl.

| | |
|---|---|
| ***F16H 25/20*** | (2006.01) |
| ***F16H 25/22*** | (2006.01) |
| ***H02K 5/173*** | (2006.01) |
| ***H02K 7/06*** | (2006.01) |
| ***H02K 7/08*** | (2006.01) |
| ***H02K 7/108*** | (2006.01) |
| ***H02K 21/14*** | (2006.01) |

(52) U.S. Cl.

CPC ....... *F16H 25/2252* (2013.01); *H02K 5/1732* (2013.01); *H02K 7/06* (2013.01); *H02K 7/083* (2013.01); *H02K 7/1085* (2013.01); *H02K 21/14* (2013.01); *F16H 2025/2031* (2013.01); *F16H 2025/2075* (2013.01); *H02K 2213/06* (2013.01)

ULTRA-SHORT ELECTROMECHANICAL SERVO MECHANISM FOR MECHANICAL FAULT SELF-RECOVERY

CROSS-REFERENCE TO RELATED APPLICATIONS

The present application is a National Stage of International Application No. PCT/CN2022/129940 filed on Nov. 4, 2022, which claims the benefit of priority to Chinese Patent Application No. 202211160078.0, filed on Sep. 22, 2022, both of which are incorporated by reference herein in their entireties for all purposes.

TECHNICAL FIELD

The present disclosure relates to an electromechanical actuator, and in particular relates to an ultra-short mechanical failure self-recovery electromechanical servo mechanism, which belongs to the mechanical field.

BACKGROUND

Core transmission load-bearing units of an electromechanical servo mechanisms or electromechanical actuator (EMA) mostly employ a roller screw or a ball screw. For the ball screw, a movement state of balls in a spiral raceway is uncertain, and there are both rolling and sliding states, which from the principle of engagement is likely to cause occurrence of jamming or stuck phenomenon. At the same time, a ball reverser due to the design rationality and processing errors and other comprehensive impact causes the mechanical failure problem of the ball screw, resulting in a major bottleneck of poor EMA reliability. The roller screw mainly combines the rotational movement of planetary gears and the axial thread meshing movement, and its movement state limitations are relatively clear. However, the thread meshing in the spatial surface can't completely get the theoretical, correct meshing solution, multiple points of contact and mainly sliding of the threads cause the failure problems of roller screw from time to time. Taken together, the above two transmission components show that the single point of failure problem of EMA is difficult to eliminate and less likely to positively improve its reliability, therefore, it is particularly important to propose a redundant EMA scheme for the failures in the screw mechanical transmission.

SUMMARY

According to embodiments of the present disclosure, an ultra-short mechanical fault self-recovery electromechanical servo mechanism, including: a servo motor assembly, a primary work roller screw pair assembly, a secondary work roller screw pair assembly, a lead screw roll limiting electromagnetic clutch assembly, a nut roll limiting electromagnetic clutch assembly and an external connection assembly, in which the servo motor assembly is mounted coaxially with the primary work roller screw pair assembly; a lead screw of the secondary work roller screw pair assembly has a first end secured to an interior of the external connection assembly, and a second end matingly connected to a lead screw of the primary work roller screw pair assembly; the lead screw roll limiting electromagnet clutch assembly is provided at an power output end of the primary work roller screw pair assembly, and the nut roll limiting electromagnetic clutch assembly is provided on the secondary work roller screw pair assembly;

the lead screw roll limiting electromagnetic clutch assembly, the nut roll limiting electromagnetic clutch assembly, and the secondary work roller screw pair assembly are inoperative in a non-fault mode; in a normal operation, the servo motor assembly drives the primary work roller screw pair assembly to output power, and under a constraint of the lead screw roll limiting electromagnetic clutch assembly, the primary work roller screw pair assembly outputs an axial reciprocating movement, and no power is provided for the secondary work roller screw pair assembly; and when the primary work roller screw pair assembly experiences a mechanical transmission failure, a fault self-recovery mode is entered, the lead screw roll limiting electromagnetic clutch assembly and the nut roll limiting electromagnetic clutch assembly are activated simultaneously, such that the servo motor assembly drives the primary work roller screw pair assembly and the secondary work roller screw pair assembly to rotate together, the primary work roller screw pair assembly becomes a static load-bearing connection, and the secondary work roller screw pair assembly realize conversion of rotation to linear output to the external connection assembly, completing mechanical fault self-recovery.

DETAILED DESCRIPTION

The present disclosure is described with reference to the drawings.

Figure 1:
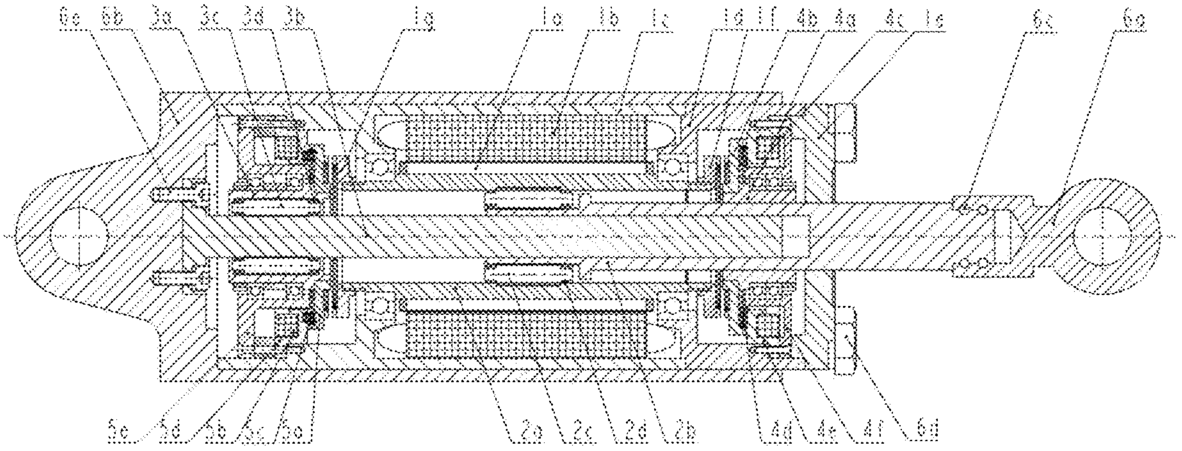
FIG. 1 is a diagram of an internal composition of an ultra-short mechanical fault self-recovery electromechanical servo mechanism provided by an embodiment of the present disclosure.

As illustrated in FIG. 1, an ultra-short mechanical fault self-recovery electromechanical servo mechanism includes a servo motor assembly, a primary work roller screw pair assembly, a secondary work roller screw pair assembly, a lead screw roll limiting electromagnetic clutch assembly, a nut roll limiting electromagnetic clutch assembly and an external connection assembly.

The external connection assembly includes a front end lug 6*a*, an outer casing 6*b*, a bearing steel ball 6*c*, a front end cap bolt 6*d*, and a rear end cap bolt 6*e*.

The servo motor assembly includes a motor rotor 1*a*, a motor stator 1*b*, a motor inner housing 1*c*, a motor front bearing seat 1*d*, a motor front end cap 1*e*, a primary clutch connection toothed disc 1*f*, and a secondary clutch connection toothed disc 1*g*.

A permanent magnet is affixed to a surface of the motor rotor 1*a* of the servo motor assembly, the motor stator 1*b* is mounted coaxially with the motor rotor 1*a*, and mounted in the motor inner housing 1*c* through an interference connection, and the motor front bearing seat 1*d* is mounted to an end of the motor inner housing 1*c*; the motor inner housing 1*c* and the motor front bearing seat 1*d* are mounted in the outer casing 6*b*, and the motor front bearing seat 1*d* is located at an open end of the outer casing 6*b*; and the primary work roller screw pair assembly includes an internal-thread end-face-tooth long nut, a hollow long shaft lead screw 2*b*, a first roller 2*c* and a first cage 2*d*. The motor rotor 1*a* is mounted on the internal-thread end-face-tooth long nut 2*a*, and two ends of the internal-thread end-face-tooth long nut 2*a* are respectively mounted on a bearing seat in the motor inner housing 1*c* and the motor front bearing seat 1*d* through a bearing; the two ends of the internal-thread end-face-tooth long nut 2*a* are respectively mounted with the primary clutch connection toothed disc 1*f* and the secondary clutch connection toothed disc 1*g*; the hollow long shaft lead screw 2*b* has a first end mounted with the first roller 2*c*, and the first roller 2*c* is mounted in the internal-thread end-face-tooth long nut 2*a* to constitute a primary work roller screw pair, the first cage 2*d* is provided at each end of the first roller 2*c*, and the hollow long shaft lead screw 2*b* has a second end extending out from a center hole of the primary clutch connection toothed disc 1*f*; and the internal-thread end-face-tooth long nut 2*a*, the first roller 2*c*, the first cage 2*d*, and the hollow long shaft lead screw 2*b* are arranged coaxially from outside to inside, and constitute the primary work roller screw pair through a thread meshing principle. The internal-thread end-face-tooth long nut 2*a* is driven by the servo motor assembly and undergoes rotational movement, and when the hollow long shaft lead screw 2*b* is restricted to move only in the axial direction, several first rollers 2*c* undergoes cyclic rotation under a constraint of the first cage 2*d*, to convert rotation of a servo motor to a linear output.

It should be noted that the internal-thread end-face-tooth long nut 2*a* herein refers to a long nut having internal threads and end face teeth.

The secondary work roller screw pair assembly includes an internal-thread spline-tooth short nut 3*a*, a solid long shaft lead screw 3*b*, a second roller 3*c*, and a second cage 3*d*. The solid long shaft lead screw 3*b* has a first end fixedly connected to an inner end face of a closed end of the outer casing 6*b* through the rear end cap bolt 6*e* to limit rotation of the solid long shaft lead screw 3*b* and cause a relative movement of the solid long shaft lead screw 3*b* in an axis direction, and the solid long shaft lead screw 3*b* has a second end inserted into a center hole of the hollow long shaft lead screw 2*b*; the second roller 3*c* is mounted to the solid long shaft lead screw 3*b* and located at an outer side of the secondary clutch connection toothed disc 1*g*; the internal-thread spline-tooth short nut 3*a* is mounted at a periphery of the second roller 3*c*, to constitute a secondary work roller screw pair; and the second cage 3*d* is provided at an end of the second roller 3*c*; and the internal-thread spline-tooth short nut 3*a*, the second roller 3*c*, the second cage 3*d* and the solid long shaft lead screw 3*b* are arranged coaxially from outside to inside, and constitute the secondary work roller screw pair through the thread meshing principle. When the internal-thread spline-tooth short nut 3*a* is driven by the servo motor assembly and undergoes the rotational movement, the second roller 3*c* and the second cage 3*d* undergo cyclic rotation to force the solid long shaft lead screw 3*b* to convert the rotation of the servo motor to the linear output.

It should be noted that the internal-thread spline-tooth short nut 3*a* herein refers to a short nut having internal threads and spline teeth.

The lead screw roll limiting electromagnetic clutch assembly includes a roll limiting spline rotary sleeve 4*a*, a first movable double sided spline toothed disc 4*b*, a first electromagnetic attraction coil 4*c*, a first reset spring 4*d*, a first fixed end face toothed disc 4*e*, and a first bearing fixing seat 4*f*. The roll limiting spline rotary sleeve 4*a* is mounted to the second end of the hollow long shaft lead screw 2*b* extending out from the center hole of the primary clutch connection toothed disc 1*f*, a center hole of the roll limiting spline rotary sleeve 4*a* is a slotted hole, two sections extending in a longitudinal direction are symmetrically provided on the hollow long shaft lead screw 2*b* and mated with the center hole of the roll limiting spline rotary sleeve 4*a*; the first movable double sided spline toothed disc 4*b* and the roll limiting spline rotary sleeve 4*a* are mated with an internal spline hole and an external spine shaft to transmit a rotational movement and reciprocate along the axial direction of the hollow long shaft lead screw 2*b*; the first electromagnetic attraction coil 4*c* is mounted in an annular groove of a second side of the first fixed end face toothed disc 4*e*, to perform electromagnetic attraction action on the first movable double sided spline toothed disc 4*b*; the first reset spring 4*d* is located a middle position between the first movable double sided spline toothed disc 4*b* and the first fixed end face toothed disc 4*e*, the spring is compressed in corresponding holes of the two parts, and can perform reset disengagement action on the first movable double sided spline toothed disc 4*b*; the first fixed end face toothed disc 4*e* is fitted over the first bearing fixing seat 4*f*, a pair of deep groove ball bearings are mounted to an inner side of the first bearing fixing seat 4*f*, and the first bearing fixing seat 4*f* rotates relative to the roll limiting spline rotary sleeve 4*a*; and flange end faces of the first bearing fixing seat 4*f* and the first fixed end face toothed disc 4*e* are jointly secured to an inner wall of the motor front bearing seat 1*d* through a countersunk head screw assembly; and The lead screw roll limiting electromagnetic clutch assembly has a hollow structure and mounted to a movement/power output side of the primary work roller screw pair assembly, and controls clutch switching of rotational movement of the primary work roller screw pair by energizing/de-energizing the first electromagnetic attraction coil 4*c*; the first movable double sided spline toothed disc 4*b* is located at a middle coaxial position of the primary clutch connection toothed disc 1*f* and the first fixed end face toothed disc 4*e*; when the first electromagnetic attraction coil 4*c* is de-energized, the first movable double sided spline toothed disc 4*b* is engaged with a toothed disc with a small diameter of the primary clutch connection toothed disc 1*f* and disengaged from a toothed disc with a large diameter of the first fixed end face toothed disc 4*e* simultaneously, utilizes an internal and external spine connection to drive the roll limiting spline rotary sleeve 4*a* to rotate together, and utilizes a flat shaft/flat hole connection to drive the hollow long shaft lead screw 2*b* to rotate together, such that the primary work roller screw pair assembly cannot output a linear movement; and when the first electromagnetic attraction coil 4*c* is energized, the first movable double sided spline toothed disc 4*b* is disengaged from the toothed disc with the small diameter of the primary clutch connection toothed disc 1*f* and engaged with the toothed disc with the large diameter of the first fixed end face toothed disc 4*e* simultaneously, the roll limiting spline rotary sleeve 4*a* is immobilized with the first fixed end face toothed disc 4*e* and utilizes the flat shaft/flat hole connection to constrain the hollow long shaft lead screw 2*b* to move only in the axial direction, such that the primary work roller screw pair assembly outputs the linear movement.

The nut roll limiting electromagnetic clutch assembly includes a second movable double sided spline toothed disc 5*a*, a second electromagnetic attraction coil 5*b*, a second reset spring 5*c*, a second fixed end face toothed disc 5*d*, and a second bearing fixing seat 5*e*. The second movable double sided spline toothed disc 5*a* and the internal-thread spline-tooth short nut 3*a* are mated with an internal spline hole and an external spine shaft to transmit a rotational movement and reciprocate along the axial direction; the second electromagnetic attraction coil 5*b* is mounted in an annular groove of a second side of the second fixed end face toothed disc 5*d* through an interference fit connection, and can perform electromagnetic attraction action on the second movable double sided spline toothed disc 5*a*; the second reset spring 5*c* is located at a middle position between the second movable double sided spline toothed disc 5*a* and the second fixed end face toothed disc 5*d*, the spring is compressed in corresponding holes of the two parts and can perform a reset disengagement action on the second movable double sided spline toothed disc 5*a*; and the second fixed end face toothed disc 5*d* is fitted over the second bearing fixing seat 5*e*, a pair of angular contact ball bearings are mounted to an inner side of the second bearing fixing seat 5*e*, and the second bearing fixing seat 5*e* rotates relative to the internal-thread spline-tooth short nut 3*a*; and flange end faces of the second bearing fixing seat 5*e* and the second fixed end face toothed disc 5*d* are jointly secured to an inner wall of the motor inner housing 1*c* through the countersunk head screw assembly; and The nut roll limiting electromagnetic clutch assembly has a hollow structure and mounted to a right side of the secondary work roller screw pair assembly, and controls clutch switching of rotational movement of the secondary work roller screw pair assembly by energizing/de-energizing the second electromagnetic attraction coil 5*b*. The second movable double sided spline toothed disc 5*a* is located at a middle coaxial position between the secondary clutch connection toothed disc 1*g* and the second fixed end face toothed disc 5*d*; when the second electromagnetic attraction coil 5*b* is de-energized, the second movable double sided spline toothed disc 5*a* is engaged with a toothed disc with a small diameter of the secondary clutch connection toothed disc 1*g* and disengaged from a toothed disc of a large diameter of the second fixed end face toothed disc 5*d* simultaneously, and utilizes an internal and external spine connection to drive the internal-thread spline-tooth short nut 3*b* to rotate together, such that the solid long shaft lead screw 3*b* of the secondary work roller screw pair assembly outputs a reciprocating linear movement; and when the second electromagnetic attraction coil 5*b* is energized, the second movable double sided spline toothed disc 5*a* is disengaged from the toothed disc with the small diameter of the secondary clutch connection toothed disc 1*g* and engaged with the toothed disc with the large diameter of the second fixed end face toothed disc 5*d* simultaneously, power of the servo motor assembly cannot be transferred to the secondary work roller screw pair assembly, and threads of the internal-thread spline-tooth short nut 3*a*, the solid long shaft lead screw 3*b* and the second roller 3*c* only bear load statically without action.

The first reset spring 4*d* and the second reset spring 5*c* are respectively mounted in corresponding seat holes of the first fixed end face toothed disc 4*e* and the second fixed end face toothed disc 5*d*, and can perform attraction reset on the first movable double sided spline toothed disc 4*b* and the second movable double sided spline toothed disc 5*a*.

The bearing steel ball 6*c* is mounted between the hollow long shaft lead screw 2*b* and the front end lug 6*a* for cyclic rolling; when the primary work roller screw pair assembly is in an normal operation, the hollow long shaft lead screw 2*b* and the front end lug 6*a* do not rotate relative to each other and can only reciprocate, extend and retract along the axis; and when the secondary work roller screw pair assembly is in operation, the hollow long shaft lead screw 2*b* and the front end lug 6*a* rotate relative to each other and reciprocate, extend and retract along the axis.

The outer casing 6*b* is fixedly flange-coupled to the solid long shaft lead screw 3*b* by the rear end cap bolt 6*e*, such that the solid long shaft lead screw 3*b* cannot rotate and can only move in the axis direction of the mechanism.

The ultra-short mechanical fault self-recovery electromechanical servo mechanism as a whole has a square appearance structure, is mounted with semi-circular connecting lugs at front and rear sides, an actuator rod can extend out from its square center hole, to achieve the reciprocating extension and retraction movement.

Figure 2:
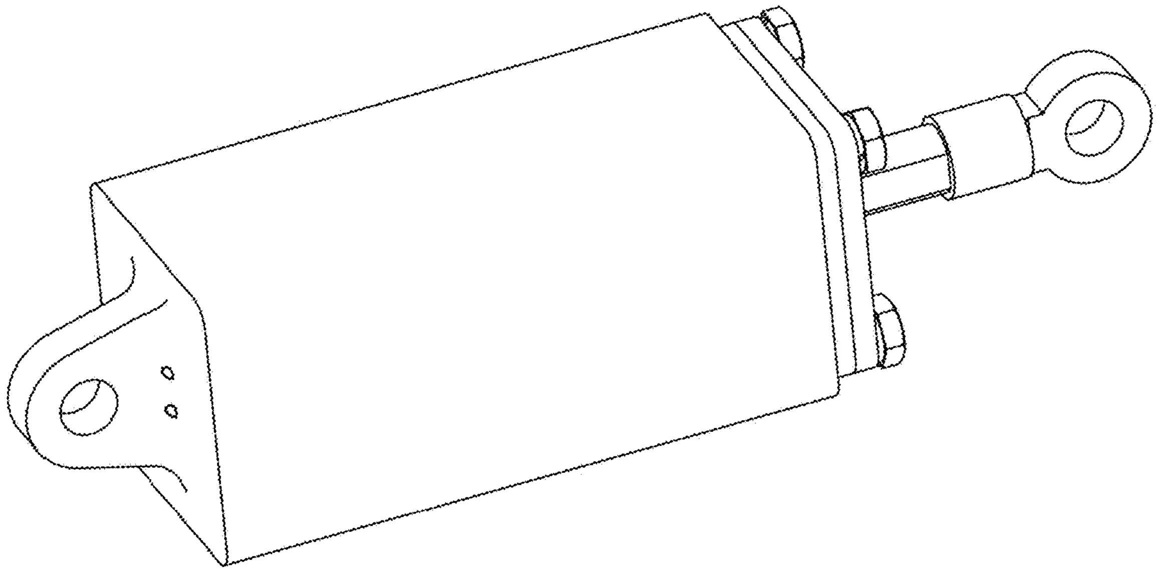
FIG. 2 is a schematic diagram of an appearance of an ultra-short mechanical fault self-recovery electromechanical servo mechanism provided by an embodiment of the present disclosure.

As illustrated in FIG. 2, an inner cavity of the outer casing 6*b* has a square structure, an outline of the motor inner housing has a square structure, and their four square faces are mated with each other to limit rolling of a servo motor.

The secondary work roller screw pair assembly, the nut roll limiting electromagnetic clutch assembly, the servo motor assembly, the primary work roller screw pair assembly, the lead screw roll limiting electromagnetic clutch assembly and the external connection assembly are mounted in a same axis sequentially from a left end to a right end, two clutches are arranged at two sides of a rotating shaft of the motor assembly, linear moving parts of two screw pairs are embedded in each other and do not interfere, and the two clutches and the secondary work roller screw pair assembly is inoperative in a non-fault mode.

In a normal operation, the servo motor assembly drives the nut of the primary work roller screw pair assembly to rotate for power output, and under a constraint of the lead screw roll limiting electromagnetic clutch assembly, its lead screw cannot rotate and can only reciprocate in the axial direction, no power is provided for the secondary work roller screw pair assembly, and the threads of the screw serve as static load-bearing connection; and when an electromechanical system detects that the primary work roller screw pair assembly experiences a mechanical transmission failure such as thread jamming/stuck, a fault self-recovery mode is switched, the lead screw roll limiting electromagnetic clutch assembly and the nut roll limiting electromagnetic clutch assembly are activated simultaneously, and end face teeth are disengaged and engaged again, such that the motor rotor 1*a* drives the hollow long shaft lead screw 2*b* and the internal-thread spline-tooth short nut 3*a* to rotate together, the primary work roller screw pair assembly becomes a static load-bearing connection, and the secondary work roller screw pair assembly realize conversion of rotation to linear output to the external connection assembly, completing mechanical fault self-recovery.

The lead screw roll limiting electromagnetic clutch assembly and the nut roll limiting electromagnetic clutch assembly need to supply power to the first electromagnetic attraction coil 4*c* and the second electromagnetic attraction coil 5*b* synchronously, to ensure that they attract or disengage from the primary clutch connection toothed disc 1*f* and the secondary clutch connection toothed disc 1*g* synchronously and handling and self-recovery of screw jamming/stuck mechanical fault can be only realized if both discs are successfully and accurately controlled simultaneously.

A pair of support bearings of the servo motor assembly and a pair of support bearings of the secondary work roller screw pair assembly can bear the same load axial force, and have a same upper speed limit requirement, while a pair of support bearings of the lead screw roll limiting electromagnetic clutch assembly cannot bear an axial force, but have the same upper speed limit requirement as the forgoing two.

The primary work roller screw pair assembly and the secondary work roller screw pair have the same lead parameter, and both can bear the same load axial force and have the same upper speed limit requirement.

Figure 3:
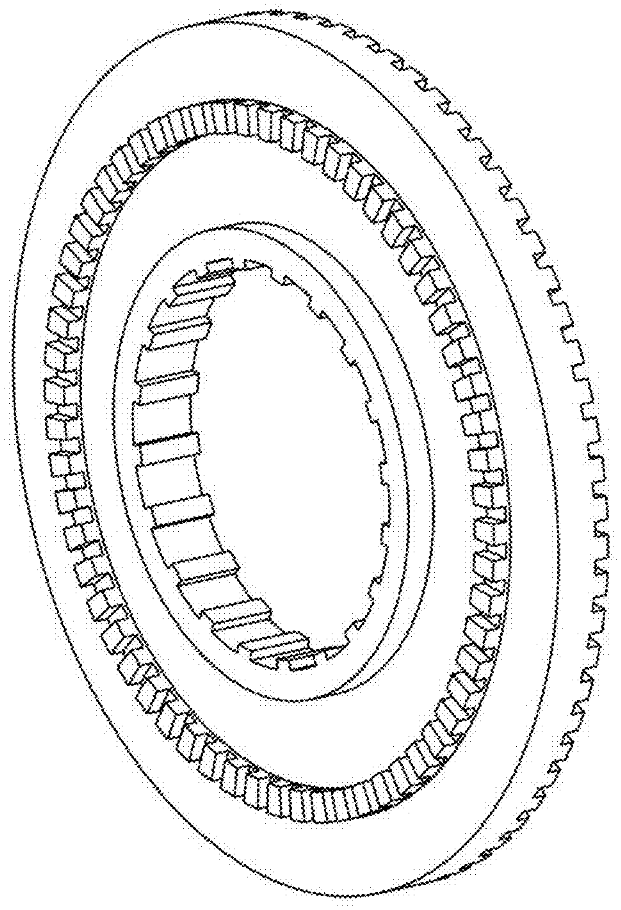
FIG. 3 is a schematic diagram of a movable double sided spline toothed disc of an ultra-short mechanical fault self-recovery electromechanical servo mechanism provided by an embodiment of the present disclosure.

As illustrated in FIG. 3, a spline is provided in the inner wall of the center hole of the first movable double sided spline toothed disc 4*b* and the second movable double sided spline toothed disc 5*a*, a ring of teeth is provided on each side face of the disc, and the rings of teeth on the two side faces have different diameters.

The toothed disc with the small diameter and the toothed disc with the large diameter of the lead screw roll limiting electromagnetic clutch assembly and the nut roll limiting electromagnetic clutch assembly have the same structural design parameters and load bearing capacity.

The primary work roller screw pair assembly has a reciprocating linear travel of 2×, and then the secondary work roller screw pair assembly has a reciprocating linear travel of 4×. That is, there is a 2× design relationship between them.

The technical solutions used in the present disclosure are: an ultra-short mechanical fault self-recovery electromechanical servo mechanism includes a servo motor assembly, a primary work roller screw pair assembly, a secondary work roller screw pair assembly, a lead screw roll limiting electromagnetic clutch assembly, a nut roll limiting electromagnetic clutch assembly and an external connection assembly;

the external connection assembly includes an outer casing, a front end cap bolt, and a rear end cap bolt;

the servo motor assembly includes a motor rotor, a motor stator, a motor inner housing, a motor front bearing seat, a motor front end cap, a primary clutch connection toothed disc, and a secondary clutch connection toothed disc; a permanent magnet is affixed to a surface of the motor rotor; the motor stator is mounted in the motor inner housing, and mounted coaxially with the motor rotor; the motor front bearing seat is mounted to an end of the motor inner housing;

the primary work roller screw pair assembly includes an internal-thread end-face-tooth long nut, a hollow long shaft lead screw, a first roller and a first cage; the motor rotor is mounted on the internal-thread end-face-tooth long nut, and two ends of the internal-thread end-face-tooth long nut are respectively mounted on a bearing seat in the motor inner housing and the motor front bearing seat through a bearing; the two ends of the internal-thread end-face-tooth long nut are respectively mounted with the primary clutch connection toothed disc and the secondary clutch connection toothed disc; the hollow long shaft lead screw has a first end mounted with the first roller, and the first roller is mounted in the internal-thread end-face-tooth long nut to constitute a primary work roller screw pair, the first cage is provided at each end of the first roller, and the hollow long shaft lead screw has a second end extending out from a center hole of the primary clutch connection toothed disc;

the lead screw roll limiting electromagnetic clutch assembly is mounted to the second end of the hollow long shaft lead screw extending out from the center hole of the primary clutch connection toothed disc, located in the motor front bearing seat, and mated with the primary clutch connection toothed disc; and an end of the motor front bearing seat is mounted with the motor front end cap and secured using the front end cap bolt;

the motor inner housing and the motor front bearing seat are mounted in the outer casing, and the motor front bearing seat is located at an open end of the outer casing;

the secondary work roller screw pair assembly includes an internal-thread spline-tooth short nut, a solid long shaft lead screw, a second roller, and a second cage; the solid long shaft lead screw has a first end fixedly connected to an inner end face of a closed end of the outer casing through the rear end cap bolt to limit rotation of the solid long shaft lead screw and cause a relative movement of the solid long shaft lead screw in an axis direction, and the solid long shaft lead screw has a second end inserted into a center hole of the hollow long shaft lead screw; the second roller is mounted to the solid long shaft lead screw and located at an outer side of the secondary clutch connection toothed disc; the internal-thread spline-tooth short nut is mounted at a periphery of the second roller, to constitute a secondary work roller screw pair; and the second cage is provided at an end of the second roller; and the nut roll limiting electromagnetic clutch assembly is mounted to the internal-thread spline-tooth short nut, and mated with the secondary clutch connection toothed disc.

Further, the lead screw roll limiting electromagnetic clutch assembly includes a roll limiting spline rotary sleeve, a first movable double sided spline toothed disc, a first electromagnetic attraction coil, a first reset spring, a first fixed end face toothed disc, and a first bearing fixing seat; and the roll limiting spline rotary sleeve is mounted to the second end of the hollow long shaft lead screw extending out from the center hole of the primary clutch connection toothed disc, a center hole of the roll limiting spline rotary sleeve is a slotted hole, two sections extending in a longitudinal direction are symmetrically provided on the hollow long shaft lead screw and mated with the center hole of the roll limiting spline rotary sleeve; the first movable double sided spline toothed disc and the roll limiting spline rotary sleeve are mated with an internal spline hole and an external spine shaft to transmit a rotational movement and reciprocate along the axial direction of the hollow long shaft lead screw; the first bearing fixing seat is mounted to the roll limiting spline rotary sleeve through a deep groove ball bearing to rotate relative to the roll limiting spline rotary sleeve, the first fixed end face toothed disc is fitted over the first bearing fixing seat, and the first reset spring is compressed in opposite holes of the first movable double sided spline toothed disc and a first side of the first fixed end face toothed disc, to perform a reset disengagement action on the first movable double sided spline toothed disc; flange end faces of the first bearing fixing seat and the first fixed end face toothed disc are jointly secured to an inner wall of the motor front bearing seat; and the first electromagnetic attraction coil is mounted in an annular groove of a second side of the first fixed end face toothed disc, to perform electromagnetic attraction on the first movable double sided spline toothed disc.

Further, the lead screw roll limiting electromagnetic clutch assembly controls clutch switching of rotational movement of the primary work roller screw pair by energizing or de-energizing the first electromagnetic attraction coil;

when the first electromagnetic attraction coil is de-energized, the first movable double sided spline toothed disc is engaged with the primary clutch connection toothed disc and disengaged from the first fixed end face toothed disc simultaneously, the first movable double sided spline toothed disc utilizes an internal and external spine connection to drive the roll limiting spline rotary sleeve to rotate together, and the roll limiting spline rotary sleeve drives the hollow long shaft lead screw to rotate together, such that the primary work roller screw pair assembly cannot output a linear movement; and when the first electromagnetic attraction coil is energized, the first movable double sided spline toothed disc is disengaged from the primary clutch connection toothed disc and engaged with the first fixed end face toothed disc simultaneously, the roll limiting spline rotary sleeve is immobilized with the first fixed end face toothed disc, and the roll limiting spline rotary sleeve constrains the hollow long shaft lead screw to move in the axial direction, such that the primary work roller screw pair assembly outputs the linear movement.

Further, the nut roll limiting electromagnetic clutch assembly includes a second movable double sided spline toothed disc, a second electromagnetic attraction coil, a second reset spring, a second fixed end face toothed disc, and a second bearing fixing seat; and the second movable double sided spline toothed disc and the internal-thread spline-tooth short nut are mated with an internal spline hole and an external spine shaft to transmit a rotational movement and reciprocate along the axial direction; the second bearing fixing seat is mounted to the internal-thread spline-tooth short nut through an angular contact ball bearing to rotate relative to the internal-thread spline-tooth short nut; the second fixed end face toothed disc is fitted over the second bearing fixing seat, and the second reset spring is compressed in opposite holes of the second movable double sided spline toothed disc and a first side of the second fixed end face toothed disc, to perform a reset disengagement action on the second movable double sided spline toothed disc; flange end faces of the second bearing fixing seat and the second fixed end face toothed disc are jointly secured to an inner wall of the motor inner housing; and the second electromagnetic attraction coil is mounted in an annular groove of a second side of the second fixed end face toothed disc, to perform electromagnetic attraction on the second movable double sided spline toothed disc.

Further, the nut roll limiting electromagnetic clutch assembly controls clutch switching of rotational movement of the secondary work roller screw pair assembly by energizing or de-energizing the second electromagnetic attraction coil;

when the second electromagnetic attraction coil is de-energized, the second movable double sided spline toothed disc is engaged with the secondary clutch connection toothed disc and disengaged from the second fixed end face toothed disc simultaneously, the second movable double sided spline toothed disc utilizes an internal and external spine connection to drive the internal-thread spline-tooth short nut to rotate together, such that the solid long shaft lead screw outputs reciprocating linear movement; and when the second electromagnetic attraction coil is energized, the second movable double sided spline toothed disc is disengaged from the secondary clutch connection toothed disc and engaged with the second fixed end face toothed disc simultaneously, power of the servo motor assembly cannot be transferred to the secondary work roller screw pair assembly, and threads of the internal-thread spline-tooth short nut, the solid long shaft lead screw, and the second roller only bear load statically without action.

Further, in the lead screw roll limiting electromagnetic clutch assembly and the nut roll limiting electromagnetic clutch assembly, power is supplied to the first electromagnetic attraction coil and the second electromagnetic attraction coil synchronously, to ensure that the first movable double sided spline toothed disc and the second movable double sided spline toothed disc attract or disengage from the primary clutch connection toothed disc and the secondary clutch connection toothed disc synchronously and realize handling and self-recovery of screw jamming/stuck mechanical fault.

Further, an inner cavity of the outer casing has a cuboid structure, the motor inner housing has a cuboid shape, and the outer casing and the motor inner housing are mated with each other to limit rolling of a servo motor.

Further, the external connection assembly further includes a front end lug and a bearing steel ball; the bearing steel ball is mounted between the hollow long shaft lead screw and the front end lug for cyclic rolling; when the primary work roller screw pair assembly outputs the linear movement, the hollow long shaft lead screw and the front end lug do not rotate relative to each other and can only reciprocate, extend and retract along the axis; and when the secondary work roller screw pair assembly outputs the linear movement, the hollow long shaft lead screw and the front end lug rotate relative to each other and reciprocate, extend and retract along the axis.

Further, the primary work roller screw pair assembly has a reciprocating linear travel of 2×, and the secondary work roller screw pair assembly has a reciprocating linear travel of 4×.

Further, the lead screw roll limiting electromagnetic clutch assembly, the nut roll limiting electromagnetic clutch assembly, and the secondary work roller screw pair assembly are inoperative in a non-fault mode; in a normal operation, the first electromagnetic attraction coil and the second electromagnetic attraction coil are energized simultaneously, the servo motor assembly drives the internal-thread end-face-tooth long nut of the primary work roller screw pair assembly to output power, and under a constraint of the lead screw roll limiting electromagnetic clutch assembly, the hollow long shaft lead screw cannot rotate and can only reciprocate in the axial direction, and no power is provided for the secondary work roller screw pair assembly; and when the primary work roller screw pair assembly experiences a mechanical transmission failure, a fault self-recovery mode is entered, the first electromagnetic attraction coil and the second electromagnetic attraction coil are de-energized simultaneously, the lead screw roll limiting electromagnetic clutch assembly and the nut roll limiting electromagnetic clutch assembly are activated simultaneously, such that the motor rotor drives the hollow long shaft lead screw and the internal-thread spline-tooth short nut to rotate together, the primary work roller screw pair assembly becomes a static load-bearing connection, and the secondary work roller screw pair assembly realize conversion of rotation to linear output to the external connection assembly, completing mechanical fault self-recovery.

The advantages of the present disclosure over the related art are:

(1) The ultra-short mechanical fault self-recovery electromechanical servo mechanism proposed by the present disclosure realizes the redundancy design, margin design and fault-tolerant design for the mechanical transmission component, and can carry out fault isolation and recovery work after fault detection and identification.

(2) The ultra-short mechanical fault self-recovery electromechanical servo mechanism proposed by the present disclosure ensures that in a case where the performance of the whole machine is not degraded, miniaturization and integration is aimed, an ultra-short zero position design is performed in a zero position length, and a significant effect on the power density of EMA is ensured.

(3) The ultra-short mechanical fault self-recovery electromechanical servo mechanism proposed by the present disclosure custom-designs a double-sided teeth electromagnetic clutch, with a compact structure, small size and higher torque transmission, and electromagnetic clutch can quickly realize the fault switching, and is suitable for application in the EMA redundant design scheme.

(4) The ultra-short mechanical failure self-recovery electromechanical servo mechanism proposed by the present invention can be expanded and applied to the field of high-reliability and high-safety actuation technology, and has a broader application prospect.

The undetailed portions of the present disclosure are of common knowledge to those skilled in the art.

What is claimed is:

1. An ultra-short mechanical fault self-recovery electromechanical servo mechanism, comprising: a servo motor assembly, a primary work roller screw pair assembly, a secondary work roller screw pair assembly, a lead screw roll limiting electromagnetic clutch assembly, a nut roll limiting electromagnetic clutch assembly and an external connection assembly, wherein the servo motor assembly is mounted coaxially with the primary work roller screw pair assembly; a solid long shaft lead screw of the secondary work roller screw pair assembly has a first end secured to an interior of the external connection assembly, and a second end matingly connected to a hollow long shaft lead screw of the primary work roller screw pair assembly; the lead screw roll limiting electromagnet clutch assembly is provided at a power output end of the primary work roller screw pair assembly, and the nut roll limiting electromagnetic clutch assembly is provided on the secondary work roller screw pair assembly;

in a normal operation, the lead screw roll limiting electromagnetic clutch assembly is in a constrained state, the nut roll limiting electromagnetic clutch assembly provides no power to the secondary work roller screw pair assembly, the servo motor assembly drives the primary work roller screw pair assembly, and under the constraint of the lead screw roll limiting electromagnetic clutch assembly, the primary work roller screw pair assembly outputs an axial reciprocating movement; and when the primary work roller screw pair assembly experiences a mechanical transmission failure, a fault self-recovery mode is entered, the lead screw roll limiting electromagnetic clutch assembly and the nut roll limiting electromagnetic clutch assembly are activated simultaneously, such that the servo motor assembly drives the primary work roller screw pair assembly and the secondary work roller screw pair assembly to rotate together, the primary work roller screw pair assembly becomes a static load-bearing connection, and the secondary work roller screw pair assembly realize conversion of rotation to linear output to the external connection assembly.

2. The ultra-short mechanical fault self-recovery electromechanical servo mechanism according to claim 1, wherein the servo motor assembly comprises a motor rotor, a motor stator, a motor inner housing, a motor front bearing seat, and a motor front end cap; a permanent magnet is affixed to a surface of the motor rotor; the motor stator is mounted in the motor inner housing and mounted coaxially with the motor rotor, and the motor front bearing seat is mounted to an end of the motor inner housing.

3. The ultra-short mechanical fault self-recovery electromechanical servo mechanism according to claim 2, wherein the servo motor assembly further comprises a primary clutch connection toothed disc and a secondary clutch connection toothed disc; the primary work roller screw pair assembly comprises an internal-thread end-face-tooth long nut, the hollow long shaft lead screw, a first roller and a first cage; the motor rotor is mounted on the internal-thread end-face-tooth long nut, and two ends of the internal-thread end-face-tooth long nut are respectively mounted on a bearing seat in the motor inner housing and the motor front bearing seat through a bearing; the two ends of the internal-thread end-face-tooth long nut are respectively mounted with the primary clutch connection toothed disc and the secondary clutch connection toothed disc; the hollow long shaft lead screw has a first end mounted with the first roller, and the first roller is mounted in the internal-thread end-face-tooth long nut to constitute a primary work roller screw pair, the first cage is provided at each end of the first roller, and the hollow long shaft lead screw has a second end extending out from a center hole of the primary clutch connection toothed disc.

4. The ultra-short mechanical fault self-recovery electromechanical servo mechanism according to claim 3, wherein the external connection assembly comprises an outer casing and a front end cap bolt; the lead screw roll limiting electromagnetic clutch assembly is mounted to the second end of the hollow long shaft lead screw extending out from the center hole of the primary clutch connection toothed disc, located in the motor front bearing seat, and mated with the primary clutch connection toothed disc; and an end of the motor front bearing seat is mounted with the motor front end cap and secured using the front end cap bolt; and the motor inner housing and the motor front bearing seat are mounted in the outer casing, and the motor front bearing seat is located at an open end of the outer casing.

5. The ultra-short mechanical fault self-recovery electromechanical servo mechanism according to claim 4, wherein the external connection assembly further comprises a rear end cap bolt; the secondary work roller screw pair assembly comprises an internal-thread spline-tooth short nut, the solid long shaft lead screw, a second roller, and a second cage; the solid long shaft lead screw has a first end fixedly connected to an inner end face of a closed end of the outer casing through the rear end cap bolt to limit rotation of the solid long shaft lead screw and cause a relative movement of the solid long shaft lead screw in an axis direction, and the solid long shaft lead screw has a second end inserted into a center hole of the hollow long shaft lead screw; the second roller is mounted to the solid long shaft lead screw and located at an outer side of the secondary clutch connection toothed disc; the internal-thread spline-tooth short nut is mounted at a periphery of the second roller, to constitute a secondary work roller screw pair; and the second cage is provided at an end of the second roller; and the nut roll limiting electromagnetic clutch assembly is mounted to the internal-thread spline-tooth short nut, and mated with the secondary clutch connection toothed disc.

6. The ultra-short mechanical fault self-recovery electromechanical servo mechanism according to claim 5, wherein the lead screw roll limiting electromagnetic clutch assembly comprises a roll limiting spline rotary sleeve, a first movable double sided spline toothed disc, a first electromagnetic attraction coil, a first reset spring, a first fixed end face toothed disc, and a first bearing fixing seat; and the roll limiting spline rotary sleeve is mounted to the second end of the hollow long shaft lead screw extending out from the center hole of the primary clutch connection toothed disc, a center hole of the roll limiting spline rotary sleeve is a slotted hole, two sections extending in a longitudinal direction are symmetrically provided on the hollow long shaft lead screw and mated with the center hole of the roll limiting spline rotary sleeve; the first movable double sided spline toothed disc and the roll limiting spline rotary sleeve are mated with an internal spline hole and an external spine shaft to transmit a rotational movement and reciprocate along the axial direction of the hollow long shaft lead screw; the first bearing fixing seat is mounted to the roll limiting spline rotary sleeve through a deep groove ball bearing to rotate relative to the roll limiting spline rotary sleeve, the first fixed end face toothed disc is fitted over the first bearing fixing seat, and the first reset spring is compressed in opposite holes of the first movable double sided spline toothed disc and a first side of the first fixed end face toothed disc, to perform a reset disengagement action on the first movable double sided spline toothed disc; flange end faces of the first bearing fixing seat and the first fixed end face toothed disc are jointly secured to an inner wall of the motor front bearing seat; and the first electromagnetic attraction coil is mounted in an annular groove of a second side of the first fixed end face toothed disc, to perform electromagnetic attraction on the first movable double sided spline toothed disc.

7. The ultra-short mechanical fault self-recovery electromechanical servo mechanism according to claim 6, wherein the lead screw roll limiting electromagnetic clutch assembly controls clutch switching of rotational movement of the primary work roller screw pair by energizing or de-energizing the first electromagnetic attraction coil;

when the first electromagnetic attraction coil is de-energized, the first movable double sided spline toothed disc is engaged with the primary clutch connection toothed disc and disengaged from the first fixed end face toothed disc simultaneously, the first movable double sided spline toothed disc utilizes an internal and external spine connection to drive the roll limiting spline rotary sleeve to rotate together, and the roll limiting spline rotary sleeve drives the hollow long shaft lead screw to rotate together, such that the primary work roller screw pair assembly cannot output a linear movement; and when the first electromagnetic attraction coil is energized, the first movable double sided spline toothed disc is disengaged from the primary clutch connection toothed disc and engaged with the first fixed end face toothed disc simultaneously, the roll limiting spline rotary sleeve is immobilized with the first fixed end face toothed disc, and the roll limiting spline rotary sleeve constrains the hollow long shaft lead screw to move in the axial direction, such that the primary work roller screw pair assembly outputs the linear movement.

8. The ultra-short mechanical fault self-recovery electromechanical servo mechanism according to claim 6, wherein the nut roll limiting electromagnetic clutch assembly comprises a second movable double sided spline toothed disc, a second electromagnetic attraction coil, a second reset spring, a second fixed end face toothed disc, and a second bearing fixing seat; and the second movable double sided spline toothed disc and the internal-thread spline-tooth short nut are mated with an internal spline hole and an external spine shaft to transmit a rotational movement and reciprocate along the axial direction; the second bearing fixing seat is mounted to the internal-thread spline-tooth short nut through an angular contact ball bearing to rotate relative to the internal-thread spline-tooth short nut; the second fixed end face toothed disc is fitted over the second bearing fixing seat, and the second reset spring is compressed in opposite holes of the second movable double sided spline toothed disc and a first side of the second fixed end face toothed disc, to perform a reset disengagement action on the second movable double sided spline toothed disc; flange end faces of the second bearing fixing seat and the second fixed end face toothed disc are jointly secured to an inner wall of the motor inner housing; and the second electromagnetic attraction coil is mounted in an annular groove of a second side of the second fixed end face toothed disc, to perform electromagnetic attraction on the second movable double sided spline toothed disc.

9. The ultra-short mechanical fault self-recovery electromechanical servo mechanism according to claim 8, wherein the nut roll limiting electromagnetic clutch assembly controls clutch switching of rotational movement of the secondary work roller screw pair assembly by energizing or de-energizing the second electromagnetic attraction coil;

when the second electromagnetic attraction coil is de-energized, the second movable double sided spline toothed disc is engaged with the secondary clutch connection toothed disc and disengaged from the second fixed end face toothed disc simultaneously, the second movable double sided spline toothed disc utilizes an internal and external spine connection to drive the internal-thread spline-tooth short nut to rotate together, such that the solid long shaft lead screw outputs reciprocating linear movement; and when the second electromagnetic attraction coil is energized, the second movable double sided spline toothed disc is disengaged from the secondary clutch connection toothed disc and engaged with the second fixed end face toothed disc simultaneously, power of the servo motor assembly cannot be transferred to the secondary work roller screw pair assembly, and threads of the internal-thread spline-tooth short nut, the solid long shaft lead screw, and the second roller only bear load statically without action.

10. The ultra-short mechanical fault self-recovery electromechanical servo mechanism according to claim 9, wherein in the lead screw roll limiting electromagnetic clutch assembly and the nut roll limiting electromagnetic clutch assembly, power is supplied to the first electromagnetic attraction coil and the second electromagnetic attraction coil synchronously, to ensure that the first movable double sided spline toothed disc and the second movable double sided spline toothed disc attract or disengage from the primary clutch connection toothed disc and the secondary clutch connection toothed disc synchronously and realize handling and self-recovery of screw jamming/stuck mechanical fault.

11. The ultra-short mechanical fault self-recovery electromechanical servo mechanism according to claim 4, wherein an inner cavity of the outer casing has a cuboid structure, the motor inner housing has a cuboid shape, and the outer casing and the motor inner housing are mated with each other to limit rolling of a servo motor.

12. The ultra-short mechanical fault self-recovery electromechanical servo mechanism according to claim 4, wherein the external connection assembly further comprises a front end lug and a bearing steel ball; the bearing steel ball is mounted between the hollow long shaft lead screw and the front end lug for cyclic rolling;

when the primary work roller screw pair assembly outputs the linear movement, the hollow long shaft lead screw and the front end lug do not rotate relative to each other and can only reciprocate, extend and retract along the axis; and when the secondary work roller screw pair assembly outputs the linear movement, the hollow long shaft lead screw and the front end lug rotate relative to each other and reciprocate, extend and retract along the axis.

13. The ultra-short mechanical fault self-recovery electromechanical servo mechanism according to claim 1, wherein the secondary work roller screw pair assembly has a reciprocating linear travel twice as far as a reciprocating linear travel of the primary work roller screw pair assembly.

* * * * *